US 7,753,451 B2

(12) United States Patent
Maebert et al.

(10) Patent No.: US 7,753,451 B2
(45) Date of Patent: Jul. 13, 2010

(54) SPORT BUCKET SEAT, FOR A MOTOR VEHICLE, ESPECIALLY A PASSENGER VEHICLE

(75) Inventors: Siegfried Maebert, Kirchheim (DE); Klaus Padberg, Stuttgart (DE); Romuald Juraschek, Calw (DE); Andreas Preuninger, Weissach-Flacht (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 0 days.

(21) Appl. No.: 11/702,513

(22) Filed: Feb. 6, 2007

(65) Prior Publication Data
US 2007/0182229 A1  Aug. 9, 2007

(30) Foreign Application Priority Data
Feb. 7, 2006  (DE)  ........................ 10 2006 005 506

(51) Int. Cl.
*B60N 2/14* (2006.01)
*B60N 2/06* (2006.01)

(52) U.S. Cl. ............................. 297/378.12; 297/354.12; 297/344.11

(58) Field of Classification Search ................. 297/353, 297/378.1, 378.12, 378.14, 452.25, 452.31, 297/DIG. 2, 352.33, 352.44, 451.11, 452.18, 297/255, 250.1, 452.21, 452.23, 452.24, 297/452.28, 452.29, 452.3, 452.34, 452.36, 297/344.11

See application file for complete search history.

(56) References Cited

U.S. PATENT DOCUMENTS

| 3,455,602 | A | * | 7/1969 | Ferrara et al. | .......... | 297/378.12 |
|---|---|---|---|---|---|---|
| 3,583,762 | A | * | 6/1971 | Strien | ........................ | 297/361.1 |
| 4,105,245 | A | * | 8/1978 | Simons et al. | ........... | 296/65.09 |
| 4,169,626 | A | * | 10/1979 | Hollar, Jr. | .................... | 297/365 |
| 4,390,207 | A | * | 6/1983 | Resag et al. | ................. | 297/362 |
| 4,775,187 | A | * | 10/1988 | Herr | ....................... | 297/378.14 |
| 4,938,527 | A | * | 7/1990 | Schmale et al. | ........ | 297/216.13 |
| 5,007,680 | A | * | 4/1991 | Miyauchi et al. | ....... | 297/378.12 |
| 5,018,788 | A | * | 5/1991 | Cedergreen | .............. | 297/378.1 |
| 5,419,616 | A | * | 5/1995 | Paetzold | ................. | 297/378.12 |
| 5,658,047 | A | * | 8/1997 | Ratza et al. | ............ | 297/378.14 |
| 5,673,972 | A | * | 10/1997 | Dudash et al. | ......... | 297/378.12 |
| 5,741,046 | A | * | 4/1998 | Leuchtmann et al. | .. | 297/378.13 |

(Continued)

FOREIGN PATENT DOCUMENTS

DE  42 32 364 C2  3/1994

(Continued)

OTHER PUBLICATIONS

European Search Report dated Dec. 14, 2007 w/English translation of pertinent portions (four (4) pages).

*Primary Examiner*—David Dunn
*Assistant Examiner*—James Alex

(57) ABSTRACT

A bucket sports seat for vehicles having at least one shape-rigid load-bearing shell with upswept side cheeks for bilateral support of the legs, the buttocks and the upper torso of a seat occupant. The seat section and the backrest section are each assigned one separately fabricated load-bearing shell. The two load-bearing shells of the seat section and of the backrest section, adjoining an upper and/or a front boundary of the side cheeks, are connected together by simple swivel joints in a transition region. In the region of the backside of the bucket sports seat, a detachable locking mechanism between the backrest section and the seat section is provided.

18 Claims, 6 Drawing Sheets

U.S. PATENT DOCUMENTS

| | | | | |
|---|---|---|---|---|
| 5,785,383 | A * | 7/1998 | Otero | 297/255 |
| 6,164,724 | A * | 12/2000 | Greaves | 297/378.14 |
| 6,167,717 | B1 * | 1/2001 | Dudley et al. | 62/291 |
| 6,378,946 | B1 * | 4/2002 | Cope et al. | 297/452.2 |
| 6,578,917 | B1 | 6/2003 | Aubert et al. | |
| D513,894 | S * | 1/2006 | Juraschek | D6/356 |
| 7,229,132 | B2 * | 6/2007 | Meeker et al. | 297/250.1 |
| 2002/0113481 | A1 * | 8/2002 | Grove | 297/378.12 |
| 2004/0061366 | A1 * | 4/2004 | Meeker et al. | 297/250.1 |
| 2004/0251721 | A1 * | 12/2004 | Yoshida | 297/250.1 |
| 2005/0006933 | A1 * | 1/2005 | Bargheer et al. | 297/216.13 |
| 2005/0168041 | A1 * | 8/2005 | Glance et al. | 297/452.18 |

FOREIGN PATENT DOCUMENTS

| | | |
|---|---|---|
| DE | 198 53 156 A1 | 5/2000 |
| DE | 103 49 857 A1 | 5/2004 |
| DE | 103 10 424 A1 | 9/2004 |
| DE | 103 56 947 B3 | 2/2005 |

* cited by examiner

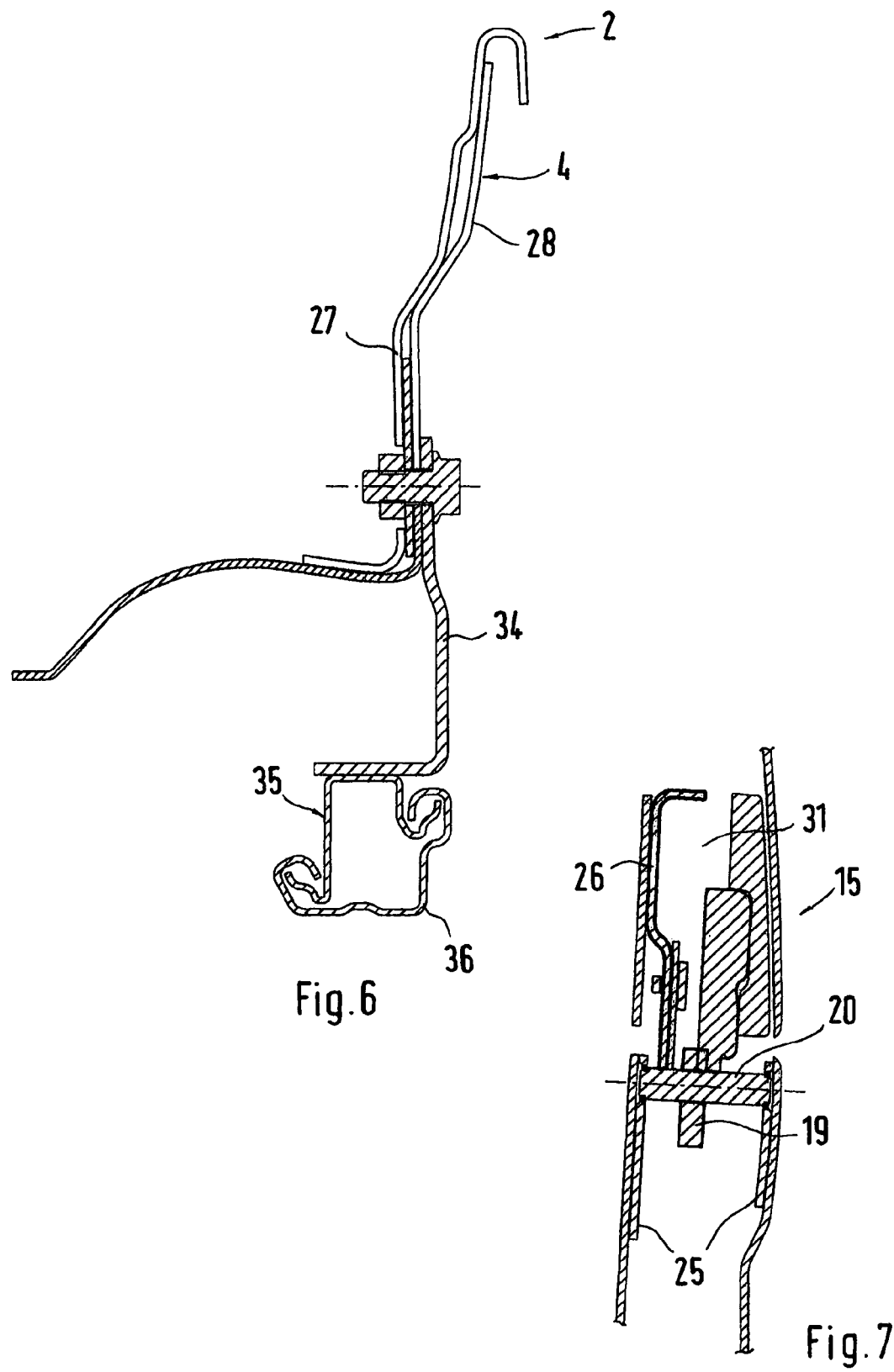

SPORT BUCKET SEAT, FOR A MOTOR VEHICLE, ESPECIALLY A PASSENGER VEHICLE

RELATED APPLICATIONS

This application claims priority to German Patent Application No. 10 2006 005 506.3, filed Feb. 7, 2006, the disclosure of which is incorporated herein by reference in its entirety.

BACKGROUND AND SUMMARY OF THE INVENTION

The present invention relates to a bucket sports seat for vehicles, in particular passenger cars, having a seat section and a backrest section. The bucket sports seat has at least one shape-rigid load-bearing shell with upswept side cheeks for bilateral support of the legs, the buttocks and the upper torso of a seat occupant.

A bucket sports seat of disclosed in DE 42 32 364 C2 consists of a one-piece, shape-rigid load-bearing shell that is contoured to the human body and into which elastic upholstered elements are inserted. Such a bucket sports seat has been highly successful in its application in both street traffic and in racing sports, since both the legs and the upper torso, in particular the buttocks region of a vehicle occupant, enjoy optimal bilateral support.

In two door passenger cars provided with a rear seat arrangement, however it is very difficult or even impossible to get into and out of the rear seat arrangement when it is constructed as a bucket sports seat.

An object of the present invention is to provide a lightweight bucket sports seat such that, while retaining optimal lateral support for the seat occupant, access to the rear seat arrangement of a vehicle is guaranteed with minimum complexity in design.

The present invention achieves this objective by providing that the seat section and the backrest section are each assigned one separately fabricated load-bearing shell. A detachable locking mechanism is provided as a transaction region between the backrest section and the seat section.

Among the advantages that are targeted chiefly with the present invention lie in the fact the invention provides a lightweight bucket sports seat, of which the backrest section can be moved forward into a swung-down position by unlocking a locking mechanism. In the swung-down position, the rear seat arrangement of the vehicle is easily accessible. When the backrest is swung back into the upright position of normal use, the conditions for a bilateral optimal side support in the leg and upper torso region and especially in the buttocks region when the vehicle is running are met.

The simple swivel joints, provided between the seat-sided load-bearing shell and the backrest-sided load-bearing shell, and the detachable rear locking mechanism exhibit a simple, inexpensive design and require very little space. In particular, the swivel joints, as seen in the transverse direction of the vehicle, require very little space and exhibit negligible weight. For example, one middle or two lateral swivel snap locks may be used as the locking mechanism. In a simple design the swivel snap lock makes possible, on one hand, a stable anchoring of the upright backrest section on the seat section and, on the other hand, guarantees a simple forward swivelling of the backrest section onto the seat section.

The load-bearing shells, which are made of a fiber-reinforced plastic, in particular a carbon fiber-reinforced plastic, exhibit negligible weight and due to their multi-shelled structure in certain places, high strength. In addition, the carbon look on the outside of the respective outer shell of the load-bearing shell imparts to the bucket sports seat a high-class appearance.

BRIEF DESCRIPTION OF THE DRAWINGS

Other objects, advantages and novel features of the present invention will become apparent from the following detailed description of the invention when considered in conjunction with the accompanying drawings, in which:

FIG. 6 is a cross-sectional view along line VI-VI of FIG. 2.

FIG. 7 is a cross-sectional view along line VII-VII of FIG. 3.

DETAILED DESCRIPTION OF THE DRAWINGS

Figure 1:
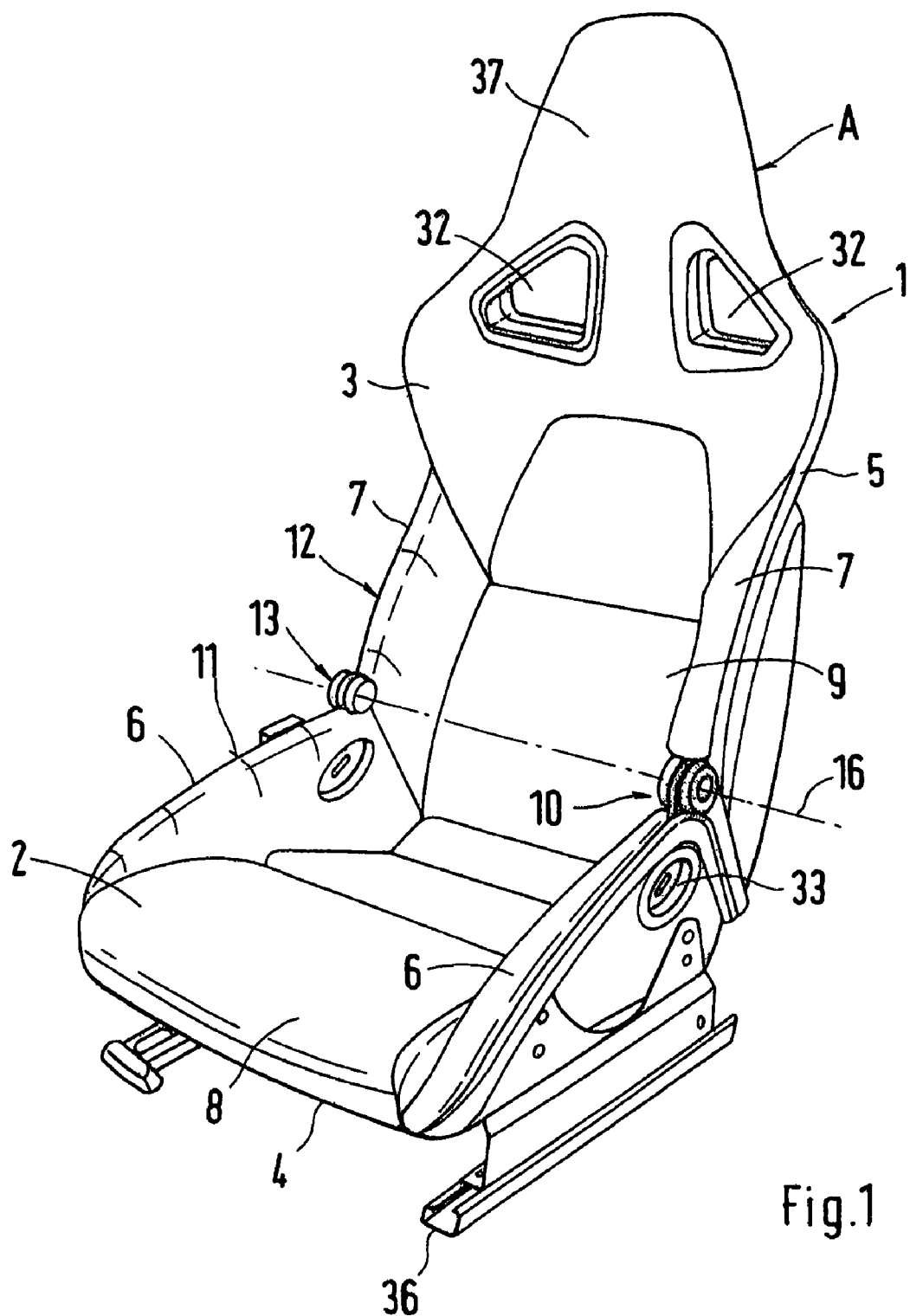
FIG. 1 is a perspective view of the front of the bucket sports seat of a motor vehicle.
Figure 2:
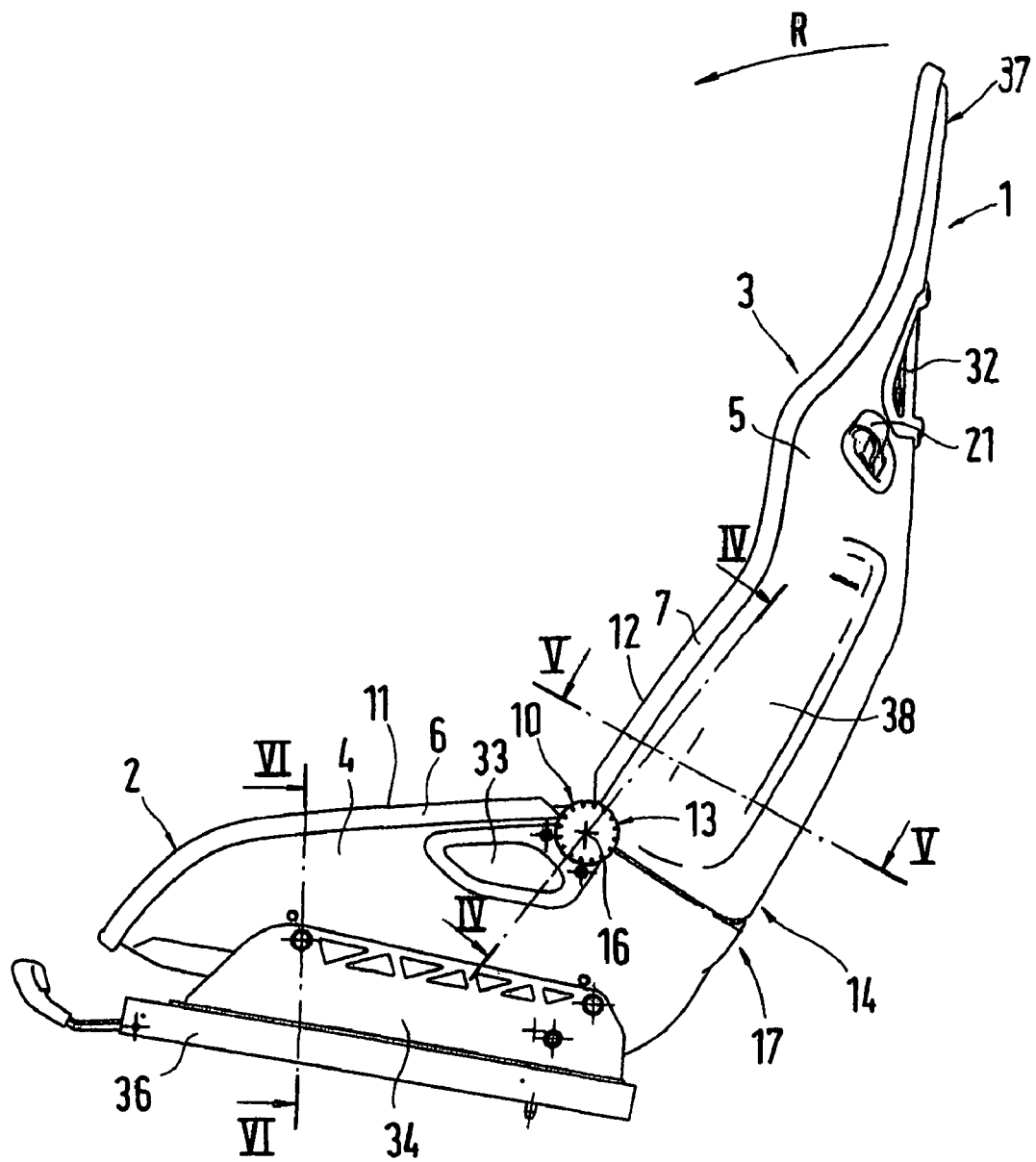
FIG. 2 is a side view of the bucket sports seat.

A bucket sports seat 1 for vehicles, in particular passenger cars like sports cars, racing cars or the like, has a seat section 2 and a backrest section 3. According to FIG. 1, the bucket sports seat 1 exhibits at least one shape-rigid load-bearing shell 4, 5 with bilateral upswung side cheeks 6, 7 for optimal bilateral support of the legs, the buttocks and the upper torso of a seat occupant while the vehicle is running. The seat section 2 and the backrest section 3 have separately fabricated load-bearing shells 4, 5 that serve to accommodate the respective elastic upholstered elements 8, 9. The upholstered elements 8, 9 include an inner foam body and an outer decorative cover (not shown in detail) and are held rigidly or detachably in position on the load-bearing shells 4, 5. The two long sides of the load-bearing shell 4 on the side of the seat section are provided with upswung side cheeks 6 that ascend upwardly from the front to the rear (FIG. 2). The backrest-sided load-bearing shell 5 has opposite side cheeks 7.

On the two long sides adjoining a side transition region 10 of an upper rim 11 of the seat-sided side cheek 6 and of a front region 12 of the backrest-sided side cheek 7, the load-bearing shells 4, 5 of the seat section 2 and of the backrest section 3 are connected together by simple swivel joints 13.

In a transversely running, backward region 14 of the bucket sports seat 1 a detachable locking mechanism 15 is provided between the seat section 2 and the backrest section 3. The backrest section 3 may be locked by choice in an upright position of normal use A by the detachable locking mechanism 15; or the backrest section can be moved about a swivel axis 16 that is formed by the two swivel joints 13, and runs transversely and is oriented in an approximately horizontal direction to the front in the direction of the arrow R into a swung down position on the seat section 2 of the bucket sports seat 1 and vice versa. In the swung down position access to a rear seat arrangement (not shown in detail) of a preferably two-door vehicle is guaranteed. Furthermore, in this position the region of the rear seat arrangement can be loaded with objects.

Figure 3:
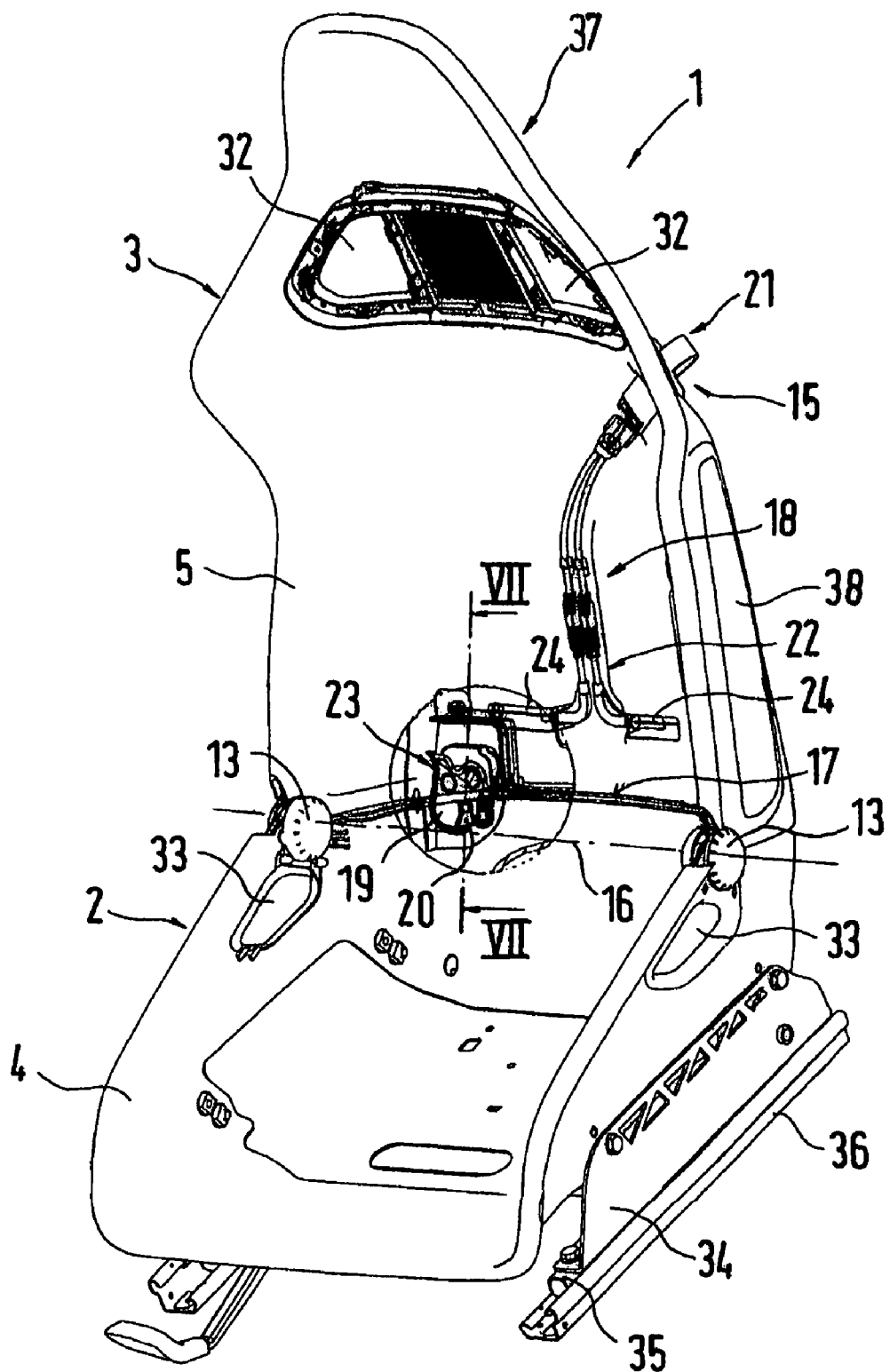
FIG. 3 is another perspective view pf the front of the bucket sports seat shown in FIG. 1.

The detachable locking mechanism 15 is disposed adjacent to a transversely running transition region 17 of the seat section 2 and the backrest section 3. The detachable locking mechanism 15 comprises at least one swivellable, spring-loaded locking hook 19, which interacts with an actuator 18 and which in a locking position engages in a locking manner with a locking bolt 20. When the handle 21 of the actuator 18 is manipulated, the locking hook 19 can be moved from a locking position into a release position, in which the backrest section 3 can be moved into the swung down position B (not shown in detail). The actuator 18 comprises a handle 21 and a transfer element 22. The transfer element 22 is operatively connected, on the one hand, to the locking hook 19 and, on the other hand, to the handle 21. The handle 21 is formed by a pull strap, a grip, a swivel lever or the like. The embodiment, according to FIG. 3, shows a pull strap, which can be disposed adjacent to the swivel joint 13 or at a higher location, on the backrest section 3 in a side region of the bucket sports seat 1.

The transfer element 22 is formed by at least one bowden control cable, a linkage or the like. The locking mechanism 15 can be constructed along the lines of a swivel snap lock or the like. Preferably the locking mechanism 15 includes two swivel snap locks 23 that, when viewed in the transverse direction, are arranged at a distance or spaced from each other. Each swivel snap lock 23 is connected to the common handle 21 by a separate bowden control cable 24. Each swivel snap lock 23 also has a bearing member 25 (FIG. 7) that accommodates the locking bolt 20, and a housing element 26 that accommodates the locking hook 19. The bearing members 25 with the locking bolts 20 are assigned to the seat section 2, whereas the housing elements 26 with the locking hooks 19 are provided on the backrest section 3.

Figure 4:
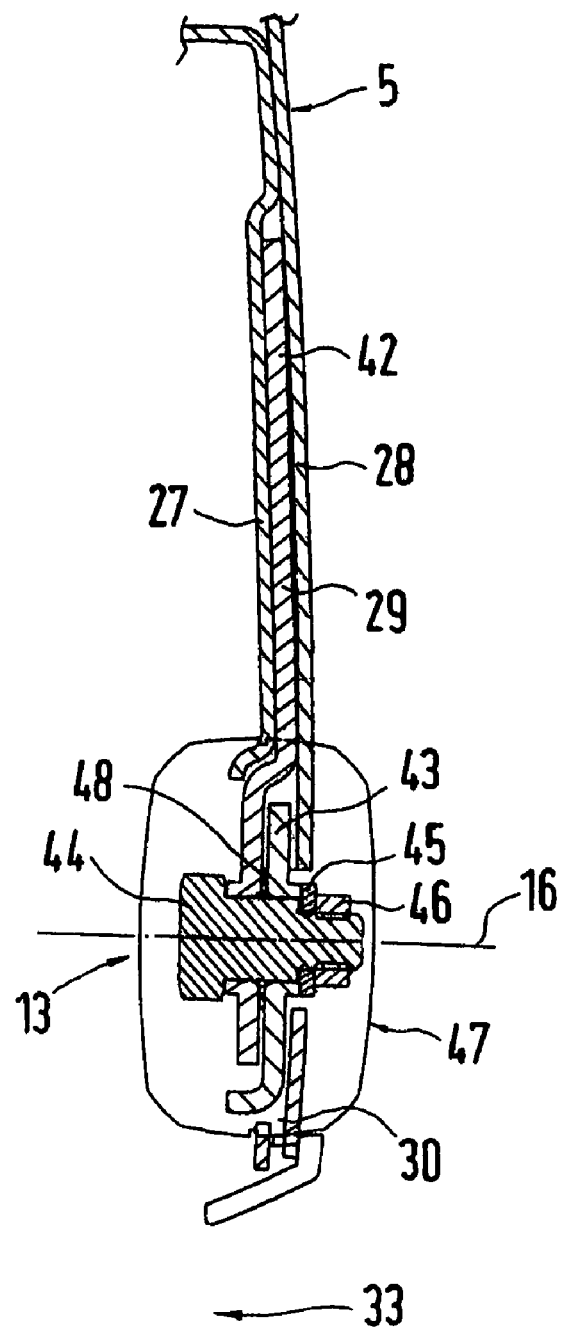
FIG. 4 is a cross-sectional view along line IV-IV of FIG. 2.
Figure 4:
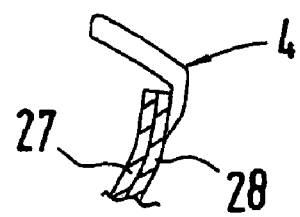
Figure 5:
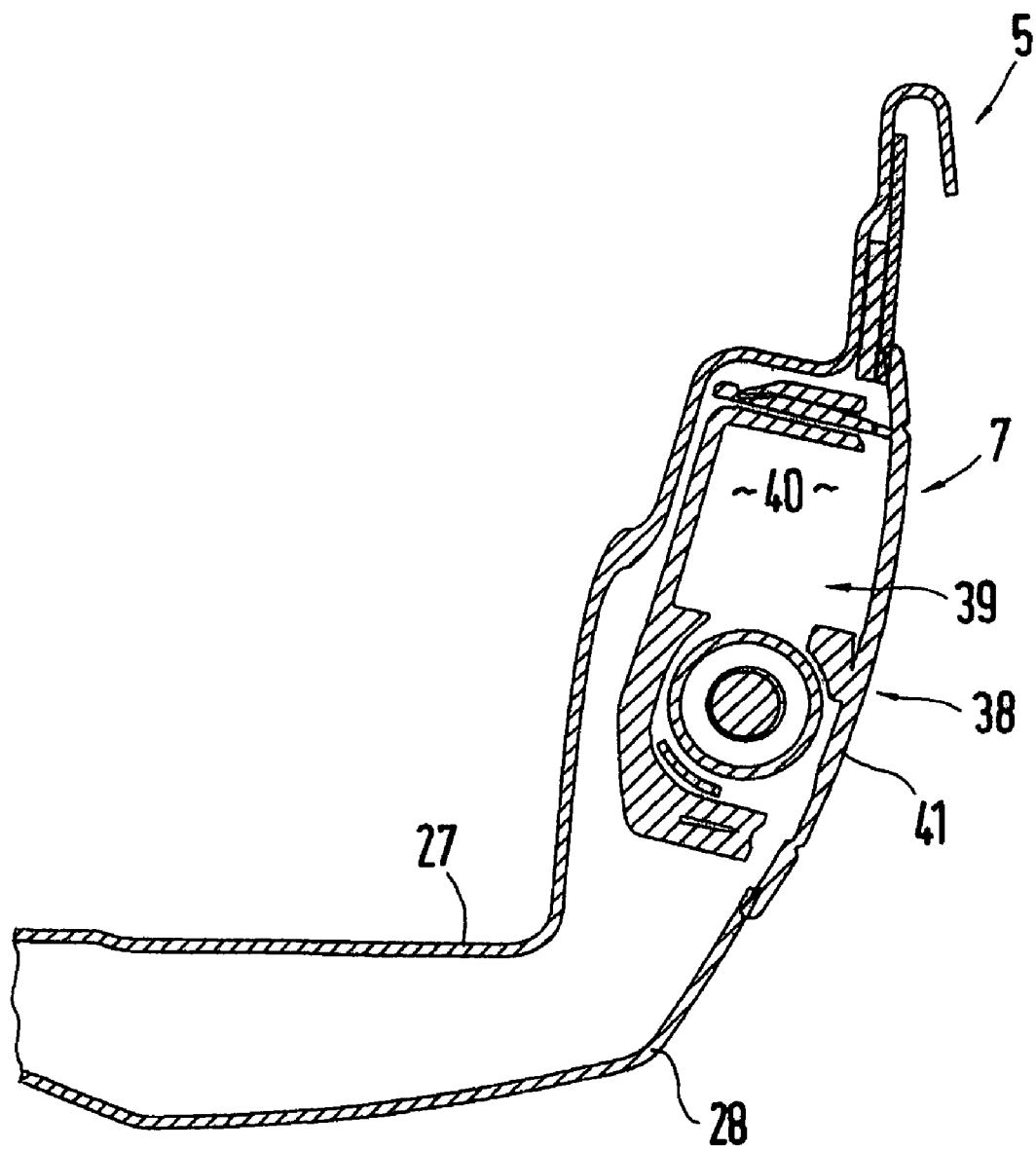
FIG. 5 is a cross-sectional view along line V-V of FIG. 2.

Each locking bolt 20 that is oriented in an approximately horizontal direction extends in the longitudinal direction of the vehicle. The locking hook 19 can be swivelled in the transverse direction of the vehicle about a swivel axis that is oriented in the longitudinal direction. Each swivel joint 13 is connected to the side cheeks 6, 7 of the backrest-sided load-bearing shell 5 and the seat-sided load-bearing shell 4. At least one of the two load-bearing shells 4, 5 of the bucket sports seat 1 is constructed in a multi-shelled manner in certain places and has an inner shell 27 and an outer shell 28 (FIGS. 4 and 5). Both load-bearing shells 4, 5 are constructed in a multi-shelled manner in certain places. The inner shell 27 and the outer shell 28 of the respective load-bearing shells 4, 5 are preferably cemented together at the unidirected wall segments.

In the region of the swivel joints 13 there are pocket-shaped or rather niche-shaped receptacles 29, 30 on the load-bearing shells 4, 5 for the stable anchoring of the swivel joints 13 (FIG. 4).

Both load-bearing shells 4, 5 are made of a fiber-reinforced, preferably carbon fiber-reinforced plastic and constructed of multiple layers. The outermost layer of the outer shells 28 of the load-bearing shells 4, 5 exhibits preferably a high-class attractive carbon look.

The components of the swivel joints 13 and/or the locking mechanism 15 are mounted in the pocket-shaped receptacles 29, 30, 31 of the load-bearing shells 4, 5 and are held in position by cementing into these receptacles 29, 30, 31. The seat section 2 and the backrest section 3 can have openings 32, 33 for passing through the components of a safety belt system (e.g. a belt strap, belt lock or the like).

The seat section 2 is constructed adjustably in the longitudinal direction of the vehicle. To this end, the load-bearing shell 4 of the seat section 2 on both long sides is connected to the seat rails 35 by external brackets 34. The seat rails 35 interact with the guide rails 36 that are connected rigidly to the chassis (FIG. 6).

The upper region of the backrest section 3 has an integrated head support 37. In the side cheeks 7 that face the outside of the vehicle and belong to the backrest section 5 of the bucket sports seat 1, a side airbag 38 is disposed locally. A prefabricated airbag module 39 is accommodated in a cavity 40 of the side cheek 7 and covered with an external cover 41 (FIG. 5).

As seen in FIG. 4, each swivel joint 13 includes a bearing member 42 that is anchored in a receptacle 29 provided on the backrest-sided load-bearing shell 5; a bearing member 43 that is mounted in a receptacle 30 provided on the seat-sided load-bearing shell 4; a transversely running joint bolt 44; a washer 45; a nut 46 and a cover 47 that is constructed as two parts. A friction body 48 may be provided between both bearing members 42, 43.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We Claim:

1. A bucket sports seat for a passenger vehicle, comprising:
   a seat part having a fore portion, an aft portion opposite the fore portion and spaced from the fore portion in a longitudinal direction of the seat;
   a backrest part;
   a transversely extending transition region between the seat part and the backrest part, the transversely extending transition region extending in a transverse direction to the longitudinal direction of the seat;
   at least one dimensionally-rigid support shell having raised side cheeks for support on both sides of an occupant's legs, buttocks, and upper body, at least one of the support shells, in one or more selected regions, including an inner shell and an outer shell;
   a separate support shell being assigned to each of the seat part and the backrest part to accommodate elastic cushion elements, with the support shells of the seat part and the backrest part connected to one another solely via pivot joints adjacent an upper or front delimitation of the side cheeks; and
   a locking device provided adjacent the transversely extending transition region, the locking device being located intermediate the pivot joints, the locking device including at least one moveable locking member connected to the backrest part and movable in the transverse direction and an associated fixed locking member connected to the seat part and extending in the longitudinal direction of the seat, the fixed locking member disposed for cooperating with a respective at least one movable locking member;
   the at least one moveable locking member including at least one swivellable, spring-loaded locking hook configured to interact with an actuator and which, in a locking position, lockingly engages with the fixed locking member, such that, when a handle of the actuator is manipulated, the locking hook is arranged to be moveable into a release position, in which the backrest part can be moved into a swung down position.

2. The bucket sports seat as claimed in claim 1, wherein the backrest part is configured to be selectively locked in an upright normal-use position by the locking device or to be moveable about a swivel axis defined by the pivot joints into a swung position on the seat section.

3. The bucket sports seat as claimed in claim 1, wherein the locking device is operatively disposed in a transversely running rear region of the bucket sports seat.

4. The bucket sports seat, as claimed in claim 1, wherein the actuator includes the handle and a transfer element, wherein the transfer element is operatively connected to the locking hook and to the handle.

5. The bucket sports seat as claimed in claim 4, wherein the handle is a pull strap.

6. The bucket sports seat as claimed in claim 4, wherein the transfer element includes at least one Bowden control cable.

7. The bucket sports seat as claimed in claim 1, wherein the locking device is a swivel snaplock mechanism.

8. The bucket sports seat as claimed in claim 1, wherein each of the pivot joints is connected to the side cheeks and the support shells of the seat part.

9. The bucket sports seat as claimed in claim 1, wherein portions of at least one of the support shells has a multi-shelled construction including an inner shell and an outer shell.

10. The bucket sports seat as claimed in claim 9, wherein the inner shell and the outer shell are cemented together at undirected wall segments.

11. The bucket sports seat as claimed in claim 1, where receptacles are provided on the support shells in the region of the pivot joints for stable anchoring of the pivot joints.

12. The bucket sports seat as claimed in claim 11, wherein components of the locking device are mounted in and connected with the pocket-shaped receptacles of the load-bearing shells.

13. The bucket sports seat as claimed in claim 1, wherein the load-bearing shells are made of a fiber-reinforced plastic, including a carbon fiber reinforced plastic.

14. The bucket sports seat as claimed in claim 1, wherein a side airbag is disposed in one of the side cheeks facing outwardly of the vehicle and associated with the backrest section.

15. A bucket sports seat for a passenger vehicle, comprising:
   a seat part having a fore portion, an aft portion opposite the fore portion and spaced from the fore portion in a longitudinal direction of the seat;
   a backrest part;
   a transversely extending transition region between the seat part and the backrest part, the transversely extending transition region extending in a transverse direction to the longitudinal direction of the seat;
   at least one dimensionally-rigid support shell having raised side cheeks for support on both sides of an occupant's legs, buttocks, and upper body, at least one of the support shells, in one or more selected regions, including an inner shell and an outer shell;
   a separate support shell being assigned to each of the seat part and the backrest part to accommodate elastic cushion elements, with the support shells of the seat part and the backrest part connected to one another solely via pivot joints adjacent an upper or front delimitation of the side cheeks; and
   a locking device provided adjacent the transversely extending transition region, the locking device being located intermediate the pivot joints, the locking device including at least one moveable locking member connected to the backrest part and movable in the transverse direction and an associated fixed locking member connected to the seat part and extending in the longitudinal direction of the seat, the fixed locking member disposed for cooperating with a respective at least one movable locking member;
   the locking device including two swivel snap locks spaced from each other, as viewed in a vehicle transverse direction, each swivel snap lock being connected to a common handle by a separate Bowden control cable.

16. The bucket sports seat as claimed in claim 15, wherein each swivel snap lock has a U-shaped bearing member that accommodates a locking bolt, and a housing element that accommodates a locking hook.

17. The bucket sports seat as claimed in claim 16, wherein the backrest part is configured to be selectively locked in an upright normal-use position by the locking device or to be moveable about a swivel axis defined by the pivot joints into a swung down position on the seat section.

18. The bucket sports seat as claimed in claim 17, wherein the locking device is operatively disposed in a transversely running rear region of the bucket sports seat.

* * * * *